United States Patent
Opdenbosch et al.

(10) Patent No.: US 8,984,873 B2
(45) Date of Patent: Mar. 24, 2015

(54) METERLESS HYDRAULIC SYSTEM HAVING FLOW SHARING AND COMBINING FUNCTIONALITY

(75) Inventors: Patrick Opdenbosch, Peoria, IL (US); Lawrence J. Tognetti, Peoria, IL (US); Bryan J. Hillman, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 780 days.

(21) Appl. No.: 13/279,177

(22) Filed: Oct. 21, 2011

(65) Prior Publication Data

US 2013/0098020 A1 Apr. 25, 2013

(51) Int. Cl.
*F16D 31/02* (2006.01)
*F15B 11/17* (2006.01)
*F15B 7/00* (2006.01)
*E02F 9/22* (2006.01)

(52) U.S. Cl.
CPC ............... *F15B 11/17* (2013.01); *F15B 7/006* (2013.01); *F15B 7/008* (2013.01); *E02F 9/2217* (2013.01); *E02F 9/2228* (2013.01); *E02F 9/2242* (2013.01); *E02F 9/2289* (2013.01); *E02F 9/2292* (2013.01); *E02F 9/2296* (2013.01); *F15B 2211/20546* (2013.01); *F15B 2211/20569* (2013.01); *F15B 2211/20576* (2013.01); *F15B 2211/27* (2013.01); *F15B 2211/30575* (2013.01); *F15B 2211/613* (2013.01); *F15B 2211/7053* (2013.01); *F15B 2211/7058* (2013.01)
USPC .................................. 60/420; 60/421; 60/427

(58) Field of Classification Search
USPC ................... 60/420, 421, 427, 484, 486, 490
See application file for complete search history.

(56) References Cited

U.S. PATENT DOCUMENTS

| 4,218,883 | A | * | 8/1980 | Pedersen ........................ 60/427 |
| 4,369,625 | A | | 1/1983 | Izumi et al. |
| 4,449,366 | A | | 5/1984 | Sato et al. |
| 4,561,249 | A | | 12/1985 | Watanabe et al. |
| 4,561,341 | A | * | 12/1985 | Aikawa ........................... 60/484 |
| 4,586,330 | A | | 5/1986 | Watanabe et al. |
| 4,768,339 | A | | 9/1988 | Aoyagi et al. |

(Continued)

FOREIGN PATENT DOCUMENTS

| EP | 1201830 A2 | 5/2002 |
| EP | 1 598 561 | 11/2005 |

(Continued)

OTHER PUBLICATIONS

Linjama, M., entitled "Digital Fluid Power-State of the Art", The 12$^{th}$ Scandinavian International Conference on Fluid Power, Tampere, Finland (May 18-20, 2011).

(Continued)

*Primary Examiner* — Michael Leslie
(74) *Attorney, Agent, or Firm* — Finnegan, Henderson, Farabow, Garrett & Dunner, LLP (57) ABSTRACT

A hydraulic system includes a variable-displacement first pump, an over-center variable-displacement first travel motor selectively connected to receive fluid pressurized by the first pump in a closed loop manner, and an over-center variable-displacement second travel motor selectively connected to receive fluid pressurized by the first pump in parallel with the first travel motor in a closed loop manner. The hydraulic system also includes a linear actuator selectively connected to receive fluid pressurized by the first pump in parallel with the first and second travel motors in a closed loop manner.

18 Claims, 2 Drawing Sheets

(56) References Cited

U.S. PATENT DOCUMENTS

| | | |
|---|---|---|
| 4,833,798 A | 5/1989 | Ehrich |
| 5,048,293 A | 9/1991 | Aoyagi |
| 5,329,767 A | 7/1994 | Hewett |
| 6,330,797 B1 | 12/2001 | Kondo |
| 6,745,992 B2 | 6/2004 | Yang et al. |
| 6,789,335 B1 | 9/2004 | Kinugawa et al. |
| 6,918,247 B1 | 7/2005 | Warner |
| 7,243,591 B2 | 7/2007 | Dixen et al. |
| 7,260,931 B2 | 8/2007 | Egelja et al. |
| 7,272,928 B2 | 9/2007 | Ariga et al. |
| 7,412,827 B2 | 8/2008 | Verkuilen |
| 7,434,391 B2 | 10/2008 | Asam et al. |
| 7,490,421 B1 | 2/2009 | Pletzer et al. |
| 7,516,613 B2 | 4/2009 | Kadlicko |
| 2004/0060747 A1 | 4/2004 | Wetzel et al. |
| 2004/0083629 A1 | 5/2004 | Kondou |
| 2004/0123499 A1 | 7/2004 | Arii |
| 2005/0012337 A1 | 1/2005 | Yoshimatsu |
| 2005/0036894 A1 | 2/2005 | Oguri |
| 2007/0044463 A1 | 3/2007 | VerKuilen et al. |
| 2008/0250783 A1 | 10/2008 | Griswold |
| 2008/0300757 A1 | 12/2008 | Kanayama et al. |
| 2008/0314038 A1 | 12/2008 | Tozawa et al. |
| 2009/0165450 A1 | 7/2009 | Cherney et al. |
| 2009/0288408 A1 | 11/2009 | Tozawa et al. |
| 2010/0000209 A1 | 1/2010 | Wada et al. |
| 2010/0000211 A1 | 1/2010 | Ikeda et al. |
| 2010/0043420 A1 | 2/2010 | Ikeda et al. |
| 2010/0071973 A1 | 3/2010 | Morinaga et al. |
| 2010/0107620 A1 | 5/2010 | Nelson et al. |
| 2010/0115936 A1 | 5/2010 | Williamson et al. |
| 2010/0162593 A1 | 7/2010 | Hughes, IV et al. |
| 2010/0162885 A1 | 7/2010 | Hughes, IV et al. |
| 2010/0163258 A1 | 7/2010 | Hughes, IV et al. |
| 2010/0218493 A1 | 9/2010 | Nakamura et al. |
| 2011/0029206 A1 | 2/2011 | Kang et al. |
| 2011/0030364 A1 | 2/2011 | Persson et al. |
| 2013/0047592 A1 | 2/2013 | Opdenbosch et al. |
| 2013/0047599 A1 | 2/2013 | Opdenbosch et al. |
| 2013/0048117 A1 | 2/2013 | Opdenbosch et al. |
| 2013/0081382 A1 | 4/2013 | Nelson et al. |
| 2013/0081383 A1 | 4/2013 | Knussman |
| 2013/0081384 A1 | 4/2013 | Opdenbosch |
| 2013/0081385 A1 | 4/2013 | Opdenbosch |
| 2013/0081704 A1 | 4/2013 | Opdenbosch |
| 2013/0098010 A1 | 4/2013 | Edler et al. |
| 2013/0098011 A1 | 4/2013 | Knussman et al. |
| 2013/0098012 A1 | 4/2013 | Opdenbosch |
| 2013/0098013 A1 | 4/2013 | Edler et al. |
| 2013/0098014 A1 | 4/2013 | Kuehn et al. |
| 2013/0098015 A1 | 4/2013 | Opdenbosch |
| 2013/0098016 A1 | 4/2013 | Opdenbosch et al. |
| 2013/0098017 A1 | 4/2013 | Knussman et al. |
| 2013/0098018 A1 | 4/2013 | Knussman |
| 2013/0098019 A1 | 4/2013 | Opdenbosch et al. |
| 2013/0098024 A1 | 4/2013 | Knussman et al. |
| 2013/0098458 A1 | 4/2013 | Knussman |
| 2013/0098459 A1 | 4/2013 | Opdenbosch |
| 2013/0098463 A1 | 4/2013 | Kuehn et al. |
| 2013/0098464 A1 | 4/2013 | Knussman |

FOREIGN PATENT DOCUMENTS

| | | |
|---|---|---|
| GB | 2 269 425 | 2/1994 |
| JP | 56-016735 | 2/1981 |
| JP | 57-134007 | 8/1982 |
| JP | 58-044133 | 3/1983 |
| JP | 02-108733 | 4/1990 |
| JP | 05-156666 A1 | 6/1993 |
| JP | 06-057786 | 3/1994 |
| JP | 07-076863 A | 3/1995 |
| JP | 10-96402 | 4/1998 |
| JP | 2006-118685 | 5/2006 |
| JP | 2007-247701 | 9/2007 |
| JP | 2011-069432 | 4/2011 |
| WO | WO 2005/024246 | 3/2005 |
| WO | WO 2009/084853 | 7/2009 |
| WO | WO 2009/123047 | 10/2009 |
| WO | WO 2010/040890 | 4/2010 |
| WO | WO 2011/041410 | 4/2011 |

OTHER PUBLICATIONS

Zimmerman, J. PhD Student/Purdue University, Center for Compact and Efficient Fluid Power PowerPoint Presentation, 2010 Annual Meeting (Jun. 14).

Zimmerman, J. et al., entitled "Hybrid Displacement Controlled Multi-Actuator Hydraulic Systems", The Twelfth Scandinavian International Conference on Fluid Power, Tampere, Finland (May 18-20, 2011).

Brezonick, M., entitled "The Potential of Pump-Controlled Hydraulics", Hydraulic Horizons, Diesel Progress North American Edition (Jan. 2009).

Zick, J., entitled "Verbesserte Leistungsausnutzung bei Erdbaumaschinen durch optimal Pumpensteuerung", Olhydraulic und pneumatic 20 (1976) Nr. 4.

Linde Hydraulics Brochure entitled "HPV-02. Variable Pumps for Closed Loop Operation", available at least as early as Aug. 31, 2011, pp. 1-36.

Grabbel et al., "An investigation of swash plate control concepts for displacement controlled actuators," International Journal of Fluid Power, 2005, 6(2), pp. 19-36.

Wang et al., "A hydraulic circuit with dynamical compensations," Institute for Fluid Power Education, 52nd National Conference on Fluid Power (IFPE 2011), Session 19.3, 529-539 (Las Vegas, Nevada, USA, Mar. 24, 2011).

Williamson et al., "Stability and motion control of inertial loads with displacement controlled hydraulic actuators," Proceedings of the 6th Fluid Power Network International (FPNI) Ph.D. Symposium (West Lafeyette, Indiana, USA, Jun. 15-19, 2010).

* cited by examiner

METERLESS HYDRAULIC SYSTEM HAVING FLOW SHARING AND COMBINING FUNCTIONALITY

TECHNICAL FIELD

The present disclosure relates generally to a hydraulic system and, more particularly, to a meterless hydraulic system having flow sharing and combining functionality.

BACKGROUND

A conventional hydraulic system includes a pump that draws low-pressure fluid from a tank, pressurizes the fluid, and makes the pressurized fluid available to multiple different actuators for use in moving the actuators. In this arrangement, a speed of each actuator can be independently controlled by selectively throttling (i.e., restricting) a flow of the pressurized fluid from the pump into each actuator. For example, to move a particular actuator at a high speed, the flow of fluid from the pump into the actuator is restricted by only a small amount. In contrast, to move the same or another actuator at a low speed, the restriction placed on the flow of fluid is increased. Although adequate for many applications, the use of fluid restriction to control actuator speed can result in flow losses that reduce an overall efficiency of a hydraulic system.

An alternative type of hydraulic system is known as a meterless hydraulic system. A meterless hydraulic system generally includes a pump connected in closed-loop fashion to a single actuator or to a pair of actuators operating in tandem. During operation, the pump draws fluid from one chamber of the actuator(s) and discharges pressurized fluid to an opposing chamber of the same actuator(s). To move the actuator(s) at a higher speed, the pump discharges fluid at a faster rate. To move the actuator with a lower speed, the pump discharges the fluid at a slower rate. A meterless hydraulic system is generally more efficient than a conventional hydraulic system because the speed of the actuator(s) is controlled through pump operation as opposed to fluid restriction. That is, the pump is controlled to only discharge as much fluid as is necessary to move the actuator(s) at a desired speed, and no throttling of a fluid flow is required.

An exemplary meterless hydraulic system is disclosed in U.S. Pat. No. 4,369,625 of Izumi et al., which published on Jan. 25, 1983 (the '625 patent). In the '625 patent, a multi-actuator meterless-type hydraulic system is described that has flow combining functionality. The hydraulic system includes a swing circuit, a boom circuit, a stick circuit, a bucket circuit, a left travel circuit, and a right travel circuit. Each of the swing, boom, stick, and bucket circuits have a pump connected to a specialized actuator in a closed-loop manner. In addition, a first combining valve is connected between the swing and stick circuits, a second combining valve is connected between the stick and boom circuits, and a third combining valve is connected between the bucket and boom circuits. The left and right travel circuits are connected in parallel to the pumps of the bucket and boom circuits, respectively. In this configuration, any one actuator can receive pressurized fluid from more than one pump such that its speed is limited by the capacity of a single pump.

Although an improvement over existing meterless hydraulic systems, the meterless hydraulic system of the '625 patent described above may still be less than optimal. In particular, operation of connected circuits of the system may only be sequentially performed. In addition, the speeds and forces of the various actuators may be difficult to control.

The hydraulic system of the present disclosure is directed toward solving one or more of the problems set forth above and/or other problems of the prior art.

SUMMARY

In one aspect, the present disclosure is directed to a hydraulic system including a variable-displacement first pump. The hydraulic system also includes an over-center variable-displacement first travel motor selectively connected to receive fluid pressurized by the first pump in a closed loop manner, and an over-center variable-displacement second travel motor selectively connected to receive fluid pressurized by the first pump in parallel with the first travel motor in a closed loop manner. The hydraulic system further includes a linear actuator selectively connected to receive fluid pressurized by the first pump in parallel with the first and second travel motors in a closed loop manner.

In another aspect, the present disclosure is directed to a hydraulic system including a variable-displacement first pump, a variable-displacement second pump, an over-center variable-displacement first travel motor selectively connected to receive fluid pressurized by the first pump in a closed loop manner, and an over-center variable-displacement second travel motor selectively connected to receive fluid pressurized by the first pump in parallel with the first travel motor in a closed loop manner. The hydraulic system also includes a linear actuator selectively connected to receive fluid pressurized by the first pump in parallel with the first and second travel motors in a closed loop manner, and a third motor selectively connected to receive fluid pressurized by the second pump in a closed loop manner. The hydraulic system further includes at least one combiner device configured to selectively allow pressurized fluid from the first pump to combine with pressurized fluid from the second pump so that a combined flow from the first and second pumps is supplied to at least one of the first travel motor, the second travel motor, the third motor, and the linear actuator.

In another aspect, the present disclosure is directed to a method of operating a hydraulic system. The method includes pressurizing fluid with a first variable-displacement pump. The first pump is capable of simultaneously supplying pressurized fluid in parallel to an over-center variable-displacement first travel motor, an over-center variable-displacement second travel motor, and a linear actuator. The method also includes selectively directing fluid pressurized by the first pump in parallel to at least one of the first travel motor, the second travel motor, or the linear actuator in a closed loop manner, and returning the pressurized fluid to the first pump.

DETAILED DESCRIPTION

Figure 1:
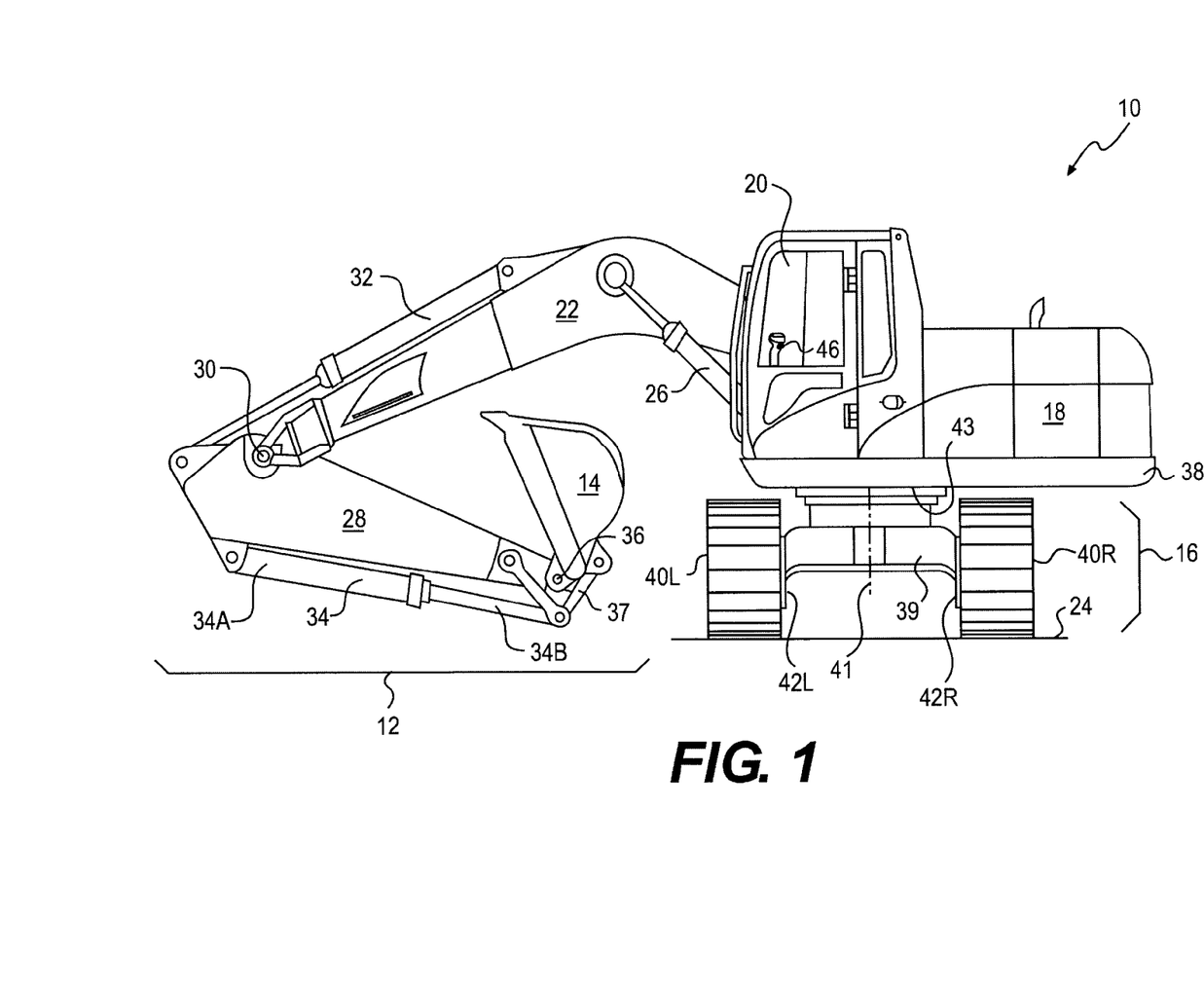
FIG. 1 is a pictorial illustration of an exemplary disclosed machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or another industry known in the art. For example, machine 10 may be an earth moving machine such as an excavator (shown in FIG. 1), a dozer, a loader, a backhoe, a motor grader, a dump truck, or any other earth moving machine. Machine 10 may include an implement system 12 configured to move a work tool 14, a drive system 16 for propelling machine 10, a power source 18 that provides power to implement system 12 and drive system 16, and an operator station 20 situated for manual control of implement system 12, drive system 16, and/or power source 18.

Implement system 12 may include a linkage structure acted on by fluid actuators to move work tool 14. Specifically, implement system 12 may include a boom 22 that is vertically pivotal about a horizontal axis (not shown) relative to a work surface 24 by a pair of adjacent, double-acting, hydraulic cylinders 26 (only one shown in FIGS. 1 and 2). Implement system 12 may also include a stick 28 that is vertically pivotal about a horizontal axis 30 by a single, double-acting, hydraulic cylinder 32. Implement system 12 may further include a single, double-acting, hydraulic cylinder 34 that is operatively connected between stick 28 and work tool 14 to pivot work tool 14 vertically about a horizontal pivot axis 36. In the disclosed embodiment, hydraulic cylinder 34 is connected at a head-end 34A to a portion of stick 28 and at an opposing rod-end 34B to work tool 14 by way of a power link 37. Boom 22 may be pivotally connected to a body 38 of machine 10. Body 38 may be pivotally connected to an undercarriage 39 and movable about a vertical axis 41 by a hydraulic swing motor 43. Stick 28 may pivotally connect boom 22 to work tool 14 by way of axis 30 and 36.

Numerous different work tools 14 may be attachable to a single machine 10 and operator controllable. Work tool 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot in the vertical direction relative to body 38 of machine 10 and to swing in the horizontal direction, work tool 14 may alternatively or additionally rotate, slide, open and close, or move in any other manner known in the art.

Drive system 16 may include one or more traction devices powered to propel machine 10. In the disclosed example, drive system 16 includes a left track 40L located on one side of machine 10, and a right track 40R located on an opposing side of machine 10. Left track 40L may be driven by a left travel motor 42L, while right track 40R may be driven by a right travel motor 42R. It is contemplated that drive system 16 could alternatively include traction devices other than tracks such as wheels, belts, or other known traction devices. Machine 10 may be steered by generating a speed and/or rotational direction difference between left and right travel motors 42L, 42R, while straight travel may be facilitated by generating substantially equal output speeds and rotational directions from left and right travel motors 42L, 42R.

Power source 18 may embody an engine such as, for example, a diesel engine, a gasoline engine, a gaseous fuel-powered engine, or any other type of combustion engine known in the art. It is contemplated that power source 18 may alternatively embody a non-combustion source of power such as a fuel cell, a power storage device, or another source known in the art. Power source 18 may produce a mechanical or electrical power output that may then be converted to hydraulic power for moving hydraulic cylinders 26, 32, 34 and left travel, right travel, and swing motors 42L, 42R, 43.

Operator station 20 may include devices that receive input from a machine operator indicative of desired machine maneuvering. Specifically, operator station 20 may include one or more operator interface devices 46, for example a joystick, a steering wheel, or a pedal, that are located proximate an operator seat (not shown). Operator interface devices 46 may initiate movement of machine 10, for example travel and/or tool movement, by producing displacement signals that are indicative of desired machine maneuvering. As an operator moves interface device 46, the operator may affect a corresponding machine movement in a desired direction, with a desired speed, and/or with a desired force.

Figure 2:
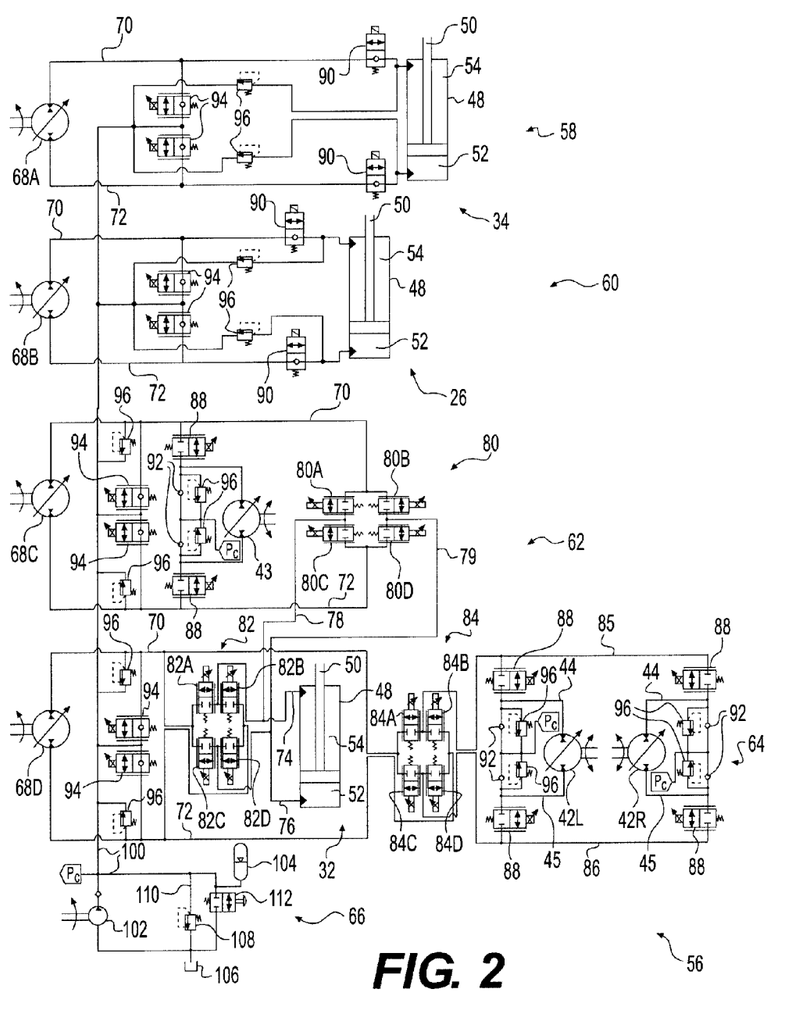
FIG. 2 is a schematic illustration of an exemplary disclosed hydraulic system that may be used in conjunction with the machine of FIG. 1.

As shown in FIG. 2, hydraulic cylinders 26, 32, 34 may each include a tube 48 and a piston assembly 50 arranged within tube 48 to form a first chamber 52 and an opposing second chamber 54. In one example, a rod portion of piston assembly 50 may extend through an end of second chamber 54. As such, second chamber 54 may be considered the rod-end chamber of hydraulic cylinders 26, 32, 34, while first chamber 52 may be considered the head-end chamber.

First and second chambers 52, 54 may each be selectively supplied with pressurized fluid and drained of the pressurized fluid to cause piston assembly 50 to displace within tube 48, thereby changing an effective length of hydraulic cylinders 26, 32, 34 and moving work tool 14 (referring to FIG. 1). A flow rate of fluid into and out of first and second chambers 52, 54 may relate to a translational velocity of hydraulic cylinders 26, 32, 34, while a pressure differential between first and second chambers 52, 54 may relate to a force imparted by hydraulic cylinders 26, 32, 34 on the associated linkage structure of implement system 12.

Swing motor 43, like hydraulic cylinders 26, 32, 34, may be driven by a fluid pressure differential. Specifically, swing motor 43 may include first and second chambers (not shown) located to either side of a pumping mechanism such as an impeller, plunger, or series of pistons (not shown). When the first chamber is filled with pressurized fluid and the second chamber is drained of fluid, the pumping mechanism may be urged to move or rotate in a first direction. Conversely, when the first chamber is drained of fluid and the second chamber is filled with pressurized fluid, the pumping mechanism may be urged to move or rotate in an opposite direction. The flow rate of fluid into and out of the first and second chambers may determine an output velocity of swing motor 43, while a pressure differential across the pumping mechanism may determine an output torque. It is contemplated that a displacement of swing motor 43 may be variable in the positive and/or negative direction (e.g., in an over-center configuration, as shown in FIG. 2, or a non-over-center configuration), if desired, such that for a given flow rate and/or pressure of supplied fluid, a speed and/or torque output of swing motor 43 may be adjusted.

Similar to swing motor 43, each of left and right travel motors 42L, 42R may be driven by creating a fluid pressure differential. Specifically, each of left and right travel motors 42L, 42R may include first and second chambers (not shown) located to either side of a pumping mechanism (not shown) via first and second actuator passages 44, 45. When the first chamber is filled with pressurized fluid via first actuator passage 44 and the second chamber is drained of fluid via second actuator passage 45, the pumping mechanism may be urged to move or rotate a corresponding traction device (40L, 40R) in a first direction. Conversely, when the first chamber is drained of the fluid via first actuator passage 44 and the second chamber is filled with the pressurized fluid via second actuator passage 45, the respective pumping mechanism may be urged to move or rotate the traction device in an opposite direction. The flow rate of fluid into and out of the first and second chambers may determine a velocity of left and right travel motors 42L, 42R, while a pressure differential between left and right travel motors 42L, 42R may determine a torque. It is contemplated that a displacement of left and right travel motors 42L, 42R may be variable in the positive and/or negative direction (e.g., in an over-center configuration, as shown in FIG. 2, or a non-over-center configuration), if desired, such that for a given flow rate and/or pressure of supplied fluid, a speed and/or torque output of travel motors 42L, 42R may be adjusted.

FIG. 2 shows swing motor 43 and left and right travel motors 42L, 42R as over-center motors, which are moveable in opposing directions independently of the direction of pressurized flow in first and second actuator passages 44, 45. Thus, the direction and speed of rotation of each of these motors 43, 42L, 42R may be adjusted by controlling the over-center motors, e.g., by adjusting the angle of the swashplate of each motor individually. For example, the direction of rotation may be changed by moving the respective swashplates of motors 43, 42L, 42R over center, and the torque or speed may be controlled by adjusting the angle of the respective swashplates of motors 43, 42L, 42R. Alternatively, motors 43, 42L, 42R may be replaced with unidirectional motors with corresponding switching valve arrangements for changing the direction and speed of rotation of the respective motors 43, 42L, 42R.

As illustrated in FIG. 2, machine 10 may include a hydraulic system 56 having a plurality of fluid components that cooperate to move work tool 14 (referring to FIG. 1) and machine 10. In particular, hydraulic system 56 may include, among other things, a first meterless circuit 58, a second meterless circuit 60, a third meterless circuit 62, a fourth meterless circuit 64, and a charge circuit 66. First meterless circuit 58 may be a bucket circuit associated with hydraulic cylinder 34. Second meterless circuit 60 may be a boom circuit associated with hydraulic cylinder 26. Third meterless circuit 62 may be a swing circuit associated with swing motor 43. Fourth meterless circuit 64 may be a stick and travel circuit associated with hydraulic cylinder 32, left travel motor 42L, and right travel motor 42R. Charge circuit 66 may be in selective fluid communication with each of first, second, third, and fourth meterless circuits 58, 60, 62, 64. It is contemplated that additional and/or different configurations of meterless circuits may be included within hydraulic system 56 such as, for example, an independent circuit associated with each separate actuator (e.g., hydraulic cylinders 32, 34, 26, left travel motor 42L, right travel motor 42R, and/or swing motor 43), if desired. Also, as an alternative, certain actuators may be interchanged.

In the disclosed embodiment, each of meterless circuits 58, 60, 62, 64 may include a plurality of interconnecting and cooperating fluid components that facilitate the use and control of the associated actuators. For example, each meterless circuit 58, 60, 62, 64 may include a respective pump 68A-68D fluidly connected to its associated rotary and/or linear actuators in parallel via a closed-loop formed by upper-side and lower-side passages. The terms "upper" and "lower" are used herein to refer to positions of the components relative to each other in FIG. 2 for ease of explanation, but the components are not limited to these relative positions in practice.

Each pump 68A-68D may have variable displacement and be controlled to draw fluid from its associated actuators and discharge the fluid at a specified elevated pressure back to the actuators in two different directions. That is, each pump 68A-68D may include a stroke-adjusting mechanism, for example a swashplate, a position of which is hydro-mechanically or electro-hydraulically adjusted based on, among other things, a desired speed of the actuators to thereby vary an output (e.g., a discharge rate) of pumps 68A-68D. The displacement of each pump 68A-68D may be adjusted from a zero displacement position at which substantially no fluid is discharged from the respective pump 68A-68D, to a maximum displacement position in a first direction at which fluid is discharged from the respective pump 68A-68D at a maximum rate into a first pump passage 70. Likewise, the displacement of each pump 68A-68D may be adjusted from the zero displacement position to a maximum displacement position in a second direction at which fluid is discharged from the respective pump 68A-68D at a maximum rate into a second pump passage 72. Each pump 68A-68D may be drivably connected to power source 18 of machine 10 by, for example, a countershaft, a belt, or in another suitable manner. Alternatively, each pump 68A-68D may be indirectly connected to power source 18 via a torque converter, a gear box, an electrical circuit, or in any other manner known in the art. It is contemplated that pumps 68A-68D of different circuits may be connected to power source 18 in tandem (e.g., via the same shaft) or in parallel (via a gear train), as desired.

As shown in FIG. 2, pumps 68A-68D may be over-center pumps or rotatable in opposing directions to produce flows of pressurized fluid in two directions. Alternatively, one or more of pumps 68A-68D may be replaced by a pump configured to produce only a unidirectional flow of pressurized fluid and a check valve for preventing back flow of pressurized fluid into the respective pump(s) 68A-68D.

One or more pumps 68A-68D may also be selectively operated as a motor. More specifically, when an associated actuator is operating in an overrunning condition (e.g., a condition in which the load drives the actuator), the fluid discharged from the actuator may have a pressure elevated higher than an output pressure of the corresponding pump(s) 68A-68D. In this situation, the elevated pressure of the actuator fluid directed back through the one or more pumps 68A-68D may function to drive the corresponding pump(s) 68A-68D to rotate with or without assistance from power source 18. Under some circumstances, one or more pumps 68A-68D may even be capable of imparting energy to power source 18, thereby improving an efficiency and/or capacity of power source 18.

Each pump 68A-68D may be connected to a linear actuator (e.g., to hydraulic cylinders 26, 32, or 34). For example, in the disclosed embodiment, pump 68A may be connected to hydraulic cylinder 34 via first pump passage 70, which serves as a rod-end passage, and second pump passage 72, which serves as a head-end passage. Similarly, pump 68B may be connected to hydraulic cylinders 26 via first pump passage 70, which serves as a rod-end passage, and second pump passage 72, which serves as a head-end passage. During extending operations of hydraulic cylinders 26 and/or 34, the respective second pump passage(s) 72 may be filled with fluid pressurized by pump 68A and/or 68B, while the respective first pump passage(s) 70 may be filled with fluid returned from hydraulic cylinders 26 and/or 34. In contrast, during a retracting operation, the respective first pump passage(s) 70 may be filled with fluid pressurized by pump 68A and/or 68B, while the respective second pump passage(s) 72 may be filled with fluid returned from hydraulic cylinders 26 and/or 34.

Also, in the disclosed embodiment, pumps 68C and/or 68D may be connected to hydraulic cylinder 32 via first and second pump passages 70, 72, a rod-end passage 74, and a head-end passage 76. During an extending operation of hydraulic cylinder 32, head-end passage 76 may be filled with fluid pressurized by pumps 68C and/or 68D, while rod-end passage 74 may be filled with fluid returned from hydraulic cylinder 32. In contrast, during a retracting operation, rod-end passage 74 may be filled with fluid pressurized by pumps 68C and/or 68D, while head-end passage 76 may be filled with fluid returned from hydraulic cylinder 32.

In addition, each of pumps 68C and 68D may be connected to a rotary actuator (e.g., to left travel motor 42L, right travel motor 42R, or swing motor 43). For example, in the disclosed embodiment, each of pumps 68C and 68D may be connected to left travel motor 42L, right travel motor 42R, and/or swing motor 43 via the respective first pump passage 70 and second pump passage 72. For example, to cause left and right travel motors 42L, 42R to rotate, one of first pump passage 70 or second pump passage 72 in meterless circuit(s) 62 and/or 64 may be filled with fluid pressurized by respective pumps 68C and/or 68D. The pressurized fluid may be communicated to left and right travel motors 42L, 42R via one of first actuator passage 44 or second actuator passage 45, and fluid may be discharged from left and right travel motors 42L, 42R into the other one of first actuator passage 44 or second actuator passage 45. Similarly, to cause swing motor 43 to rotate, one of first pump passage 70 or second pump passage 72 in meterless circuit 62 may be filled with fluid pressurized by pumps 68C and/or 68D, while the other one of first pump passage 70 or second pump passage 72 in meterless circuit 62 may be filled with fluid discharged from swing motor 43. As noted above, in the disclosed embodiment, since motors 42L, 42R, 43 are over-center motors, the direction and speed of rotation of motors 42L, 42R, 43 may be controlled independently by displacing the respective swashplates of motors 42L, 42R, 43. Alternatively, the direction and flow rate of fluid supplied to motors 42L, 42R, 43 may be adjusted to change the direction and speed of rotation of motors 42L, 42R, 43, e.g., by controlling pumps 68C and/or 68D, or adjusting one or more valves disposed between pumps 68C and/or 68D and motors 42L, 42R, 43.

In certain situations, it may be desirable to fluidly connect the actuators in meterless circuits 62 and 64 to both of pumps 68C and 68D simultaneously. For this purpose, a combiner valve arrangement 80 may selectively connect up to two meterless circuits 62 and 64. In the disclosed embodiment, one combiner valve arrangement 80 is provided to fluidly connect meterless circuits 62, 64. By controlling combiner valve arrangement 80, each of hydraulic cylinder 32, swing motor 43, left travel motor 42L, and right travel motor 42R may be selectively connected to both pumps 68C and 68D in a closed loop manner. Combiner valve arrangement 80 may include up to four independent metering cartridge valves. For example, in the disclosed embodiment, combiner valve arrangement 80 includes a first upper valve 80A, a second upper valve 80B, a first lower valve 80C, and a second lower valve 80D. Alternatively, combiner valve arrangement 80 may be realized using other types of valves, such as spool valves, poppet valves, etc. Valves 80A-80D may be on/off type valves, or proportional valves that are adjustable between full and partial flow-passing positions and a flow-blocking position. For example, valves 80A-80D may be solenoid-actuated between full and partial flow-passing positions, and spring-biased to the flow-blocking position. First upper valve 80A may be positioned between first pump passage 70 of meterless circuit 62 and a first combining passage 78 in fluid communication with rod-end passage 74 of hydraulic cylinder 32. Second upper valve 80B may be positioned between first pump passage 70 of meterless circuit 62 and a second combining passage 79 in fluid communication with head-end passage 76 of hydraulic cylinder 32. First lower valve 80C may be positioned between second pump passage 72 of meterless circuit 62 and first combining passage 78. Second lower valve 80D may be positioned between second pump passage 72 of meterless circuit 62 and second combining passage 79. As described in detail below, valves 80A-80D provide flow combining functionality to allow each actuator of meterless circuits 62, 64 to be fluidly connected in a closed loop manner to both pumps 68C and 68D simultaneously.

The flow passing from pumps 68C and/or 68D to hydraulic cylinder 32 and left and right travel motors 42L, 42R may also be controlled by at least one associated switching valve, such as switching valve arrangements 82, 84. In the disclosed embodiment, a first switching valve arrangement 82 is disposed between first and second pump passages 70, 72 in meterless circuit 64 and hydraulic cylinder 32, and a second switching valve arrangement 84 is disposed between first and second pump passages 70, 72 in meterless circuit 64 and left and right travel motors 42L, 42R. Switching valve arrangements 82, 84 may be controlled to adjust flow to the respective actuators.

First switching valve arrangement 82 may control flow from pump 68D to hydraulic cylinder 32 and swing motor 43, and flow from pump 68C to left and right control motors 42L, 42R. First switching valve arrangement 82 may include four valves (e.g., four independent metering valves), including a first rod-end valve 82A, a second rod-end valve 82B, a first head-end valve 82C, and a second head-end valve 82D. First rod-end valve 82A may be positioned between first pump passage 70 of meterless circuit 64 and rod-end passage 74. Second rod-end valve 82B may be positioned between second pump passage 72 of meterless circuit 64 and rod-end passage 74. First head-end valve 82C may be positioned between first pump passage 70 of meterless circuit 64 and head-end passage 76. Second head-end valve 82D may be positioned between second pump passage 72 of meterless circuit 64 and head-end passage 76.

Second switching valve arrangement 84 may control flow direction from pumps 68C and/or 68D to left and right travel motors 42L, 42R, and may include four valves (e.g., four independent metering valves), including a first upper valve 84A, a second upper valve 84B, a first lower valve 84C, and a second lower valve 84D. First upper valve 84A may be positioned between first pump passage 70 of meterless circuit 64 and first travel passage 85. Second upper valve 84B may be positioned between second pump passage 72 of meterless circuit 64 and first travel passage 85. First lower valve 84C may be positioned between first pump passage 70 of meterless circuit 64 and second travel passage 86. Second lower valve 84D may be positioned between second pump passage 72 of meterless circuit 64 and second travel passage 86.

Valves 82A-82D and 84A-84D may be on/off type valves, or proportional valves that are adjustable between full and partial flow-passing positions and a flow-blocking position. For example, valves 82A-82D and 84A-84D may be solenoid-actuated between full and partial flow-passing positions, and spring-biased to the flow-blocking position. Alternatively, each set of four valves 82A-82D, 84A-84D may be replaced by a single on/off or proportional switching valve configured to move between a flow-passing position and a flow-blocking position. In its flow passing position, the single switching valve for replacing valves 84A-84D may allow flow to pass between first pump passage 70 of meterless circuit 64 and first travel passage 85, and to pass between second pump passage 72 of meterless circuit 64 and second travel passage 86. In its flow-blocking position, flow may not pass between these passages. Similarly, in its flow passing position, the single switching valve that may replace valves 82A-82D may allow flow to pass between first pump passage 70 in meterless circuit 64 and rod-end passage 74, and to pass between second pump passage 72 in meterless circuit 64 and head-end passage 76. In its flow-blocking position, flow may not pass between these passages.

In addition to combiner valve arrangement 80, switching valve arrangements 82, 84 may assist in providing flow combining functionality to allow hydraulic cylinder 32 and left and right travel motors 42L, 42R to be fluidly connected in a closed loop manner to both pumps 68C and 68D simultaneously. The operation of combiner valve arrangement 80 and switching valve arrangements 82, 84 and may depend on, for example, the direction of discharge of fluid from pumps 68C, 68D and/or the desired direction of movement of the actuators.

For example, if combining flow from pumps 68C and 68D to supply to one or more actuators in meterless circuits 62, 64 is desired, valves 80A, 82A, 84A, 80D, 82D, 84D may be moved to their flow-passing positions. Then, if retraction of hydraulic cylinder 32 is desired, first pump passages 70 of meterless circuits 62, 64 may be pressurized by pumps 68C and 68D. With 80A, 82A, 84A in their flow-passing positions, pressurized fluid from pumps 68C and 68D may combine within first pump passages 70 of meterless circuits 62, 64, first combining passage 78, and first travel passage 85. The combined pressurized fluid may be supplied to swing motor 43, second chamber 54 of hydraulic cylinder 32, and left and right travel motors 42L, 42R. Also, at this same time, with valves 80D, 82D, 84D in their flow-passing positions, flow discharged from swing motor 43, first chamber 52 of hydraulic cylinder 32, and left and right travel motors 42L, 42R may combine within second travel passage 45, second combining passage 79, and second pump passages 72 of meterless circuits 62, 64, and may flow back to pumps 68C and 68D.

On the other hand, if extension of hydraulic cylinder 32 is desired, second pump passages 72 of meterless circuits 62, 64 may be pressurized by pumps 68C and 68D. With valves 80D, 82D, 84D in their flow-passing positions, pressurized fluid from pumps 68C and 68D may combine within second pump passages 72 of meterless circuits 62, 64, second combining passage 79, and second travel passage 86. The combined pressurized fluid may be supplied to swing motor 43, first chamber 52 of hydraulic cylinder 32, and left and right travel motors 42L, 42R. Also, at this same time, with valves 80A, 82A, 84A in their flow-passing positions, flow discharged from swing motor 43, second chamber 54 of hydraulic cylinder 32, and left and right travel motors 42L, 42R may combine within first travel passage 44, first combining passage 78, and first pump passages 70 of meterless circuits 62, 64, and may flow back to pumps 68C and 68D.

Thus, with valves 80A, 82A, 84A, 80D, 82D, 84D moved to their flow-passing positions, hydraulic cylinder 32, swing motor 43, and left and right travel motors 42L, 42R may be simultaneously connected in a closed loop manner to pumps 68C and 68D. Alternatively, other combinations of valves 80A-80D, 82A-82D, 84A-84D may be actuated, depending on which passages (e.g., first and second pump passages 70, 72 of meterless circuits 62, 64, first and second combining passages 78, 79, first and second travel passages 85, 86, etc.) are intended to be pressurized and the direction of flow from pumps 68C and 68D. For example, to change which one of first and second travel passages 44, 45 is pressurized, valves 84A and 84D may move from flow-passing positions to flow-blocking positions, and valves 84B and 84C may be moved to flow passing positions.

Displacement control of pumps 68C and 68D may depend on the desired direction of movement (e.g., extension or retraction) and desired speed of hydraulic cylinder 32. Since swing motor 43 and left and right travel motors 42L, 42R are over-center motors, the direction and speed of rotation of each of these variable-displacement rotary actuators may be controlled individually by adjusting the angle of the respective swashplates.

In certain situations, it may be desirable to direct flow from pumps 68C and 68D to separate actuators in meterless circuits 62, 64. For example, it may be desired to communicate flow pressurized by pump 68C in a closed loop manner only to swing motor 43 and hydraulic cylinder 32 (i.e., not left or right travel motors 42L, 42R) while communicating flow pressurized by pump 68D in a closed loop manner only to left and right travel motors 42L and 42R (i.e., not swing motor 43 or hydraulic cylinder 32). In this situation, valves 82A-82D may be moved to (or remain in) their flow-blocking positions, and valves 80A-80D and 84A-84D may be actuated as described above (valves 80A, 80D, 82D, 84D in their flow-passing positions). Also, to change the direction of movement of hydraulic cylinder 32, the direction of flow from pump 68C may be changed, as described above. Alternatively, first upper valve 80A and second lower valve 80D may be moved to their flow-blocking positions while second upper valve 80B and first lower valve 80C are moved to their flow-passing positions.

Also, it may be desired to communicate flow pressurized by pump 68C in a closed loop manner only to swing motor 43 (i.e., not hydraulic cylinder 32 or left or right travel motors 42L, 42R) while communicating flow pressurized by pump 68D in a closed loop manner only to hydraulic cylinder 32 and left and right travel motors 42L and 42R (i.e., not swing motor 43). In this situation, valves 80A-80D may be moved to (or remain in) their flow-blocking positions to prevent flows from pumps 68C and 68D from combining, and valves 82A-82D and 84A-84D may be actuated as described above (valves 82A, 82D, 84A, 84D in their flow-passing positions). Also, to change the direction of movement of hydraulic cylinder 32, the direction of flow from pump 68D may be changed, as described above. Alternatively, first rod-end valve 82A and second head-end valve 82D may be moved to their flow-blocking positions while second rod-end valve 82B and first head-end valve 82C may be moved to their flow-passing positions.

Valves 80A-80D, 82A-82D, and 84A-84D may also meter flow to allow pressure adjustment of an actuator independently from other actuators, such as the actuators within the same closed loop. For example, if hydraulic cylinder 32, left travel motor 42L, and right travel motor 42R are connected in a closed loop manner only to pump 68D (i.e., valves 80A-80D are in their flow-blocking positions), then valves 82A-82D may be controlled to meter flow so that the pressure of the hydraulic cylinder 32 may be adjusted with respect to pressures in the other actuators and/or circuits.

During some operations, it may be desirable to cause movement of an actuator without causing movement of other actuator(s) within the same circuit or closed loop. For this purpose, certain rotary actuators may be provided with isolation valves 88 capable of substantially isolating the associated actuator (e.g., swing motor 43, left travel motor 42L, and right travel motor 42R) from its associated pump(s) 68C and/or 68D and other actuators in meterless circuits 62, 64. In the disclosed embodiment, isolation valves 88 may be on/off type valves, or proportional valves that are adjustable between full and partial flow-passing positions and a flow-blocking position. For example, the valves may be solenoid-actuated between full and partial flow-passing positions, and spring-biased to the flow-blocking position. When isolation valves 88 are in the flow-blocking position, fluid supplied by pump (s) 68C and/or 68D may not pass through and substantially affect the motion of the corresponding actuator. In addition to isolating the corresponding actuator from pump(s) 68C and/or 68D and movement of the other actuators, isolation valves 88 may also function as load-holding valves, hydraulically locking movement of the rotary actuator, when the rotary actuator has a non-zero displacement and isolation valves 88 are in their flow-blocking positions.

Thus, although the combined flow from both pumps 68C and 68D may be communicated in a closed loop manner to each of swing motor 43 and left and right travel motors 42L, 42R, isolation valves 88 associated with any of the motors 43, 42L, 42R may be controlled to block flow to one or more of the actuators. By blocking flow to one or more of the actuators, the flow from pumps 68C and/or 68D may be supplied to the actuators that are not blocked. For example, the pair of isolation valves 88 associated with swing motor 43 may be moved to their flow-blocking positions (so that swing motor 43 does not move) while combiner valve arrangement 80 may allow a combined flow from both pumps 68C and 68D to be communicated in a closed loop manner to hydraulic cylinder 32, left travel motor 42L, and right travel motor 42R. Accordingly, each pair of isolation valves 88 may be separately controllable to select which actuators receive flow from pumps 68C and/or 68D.

Also, valves 84A-84D of switching valve arrangement 84 may serve as isolation valves for both left and right travel motors 42L, 42R. For example, if it is desired that left and right travel motors 42L, 42R do not move, the flow from pumps 68C and/or 68D may be blocked from left and right travel motors 42L, 42R simultaneously by moving valves 84A-84D to their flow-blocking positions.

Load holding valves 90 may be fluidly connected to hydraulic cylinders 26, 34 to hydraulically lock movement of the associated actuators when in their flow-blocking positions. Load holding valves 90 may also serve as isolation valves to block flow from the associated pumps to the associated actuators. In the disclosed embodiment, load holding valves 90 may be on/off type valves, hydro-mechanical valves, etc. Also, check valves 92 may be provided to assist in regulating the flow of makeup fluid, e.g., supplied to or discharged from pumps 68A-68D and/or the actuators (e.g., hydraulic cylinders 26, 32, 34, swing motor 43, left and right travel motors 42L, 42R, etc.).

It will be appreciated by those of skill in the art that the respective rates of hydraulic fluid flowing into and out of the actuators may not be equal. For example, the respective rates of hydraulic fluid flowing into and out of first and second chambers 52, 54 of hydraulic cylinders 26, 32, 34 during extension and retraction may not be equal. Because of the location of the rod portion of piston assembly 50 within second chamber 54, piston assembly 50 may have a reduced pressure area within second chamber 54, as compared with a pressure area within first chamber 52. Accordingly, during retraction of hydraulic cylinders 26, 32, 34, more hydraulic fluid may be forced out of first chamber 52 than can be consumed by second chamber 54 and, during extension, more hydraulic fluid may be consumed by first chamber 52 than is forced out of second chamber 54. In order to accommodate the excess fluid discharge during retraction and the additional fluid required during extension, each of meterless circuits 58, 60, 62, 64 may be provided with two makeup valves 94 and two relief valves 96 that connect first and second pump passages 70, 72 to charge circuit 66 via a common passage 100.

Makeup valves 94 may each be a proportional valve that is disposed between common passage 100 and one of first and second pump passages 70, 72 and configured to selectively allow pressurized fluid from charge circuit 66 to enter first and second pump passages 70, 72. In particular, each of makeup valves 94 may be solenoid-actuated from a first position at which fluid freely flows between common passage 100 and the respective first and second pump passage 70, 72, toward a second position at which fluid from common passage 100 may flow only into first and second pump passage 70, 72 when a pressure of common passage 100 exceeds the pressure of first and second pump passages 70, 72 by a threshold amount. Makeup valves 94 may be spring-biased toward their second positions, and only moved toward their first positions during operations known to have need of positive or negative makeup fluid. Makeup valves 94 may also be used to facilitate fluid regeneration between first and second pump passages 70, 72 within a particular circuit, by simultaneously moving together at least partway to their first positions.

Relief valves 96 may be provided to allow fluid relief from each meterless circuit 58, 60, 62, 64 into charge circuit 66 when a pressure of the fluid exceeds a set threshold of relief valves 96. Relief valves 96 may be set to operate at relatively high pressure levels in order to prevent damage to hydraulic system 56, for example, at levels that may only be reached when hydraulic cylinders 26, 32, 34 reach an end-of-stroke position and the flow from associated pumps 68A-68D is nonzero, during a stall condition due to a large load, or during a failure condition of hydraulic system 56.

Charge circuit 66 may include at least one hydraulic source fluidly connected to common passage 100 described above. In the disclosed embodiment, charge circuit 66 has two sources, including a charge pump 102 and an accumulator 104, which may be fluidly connected to common passage 100 in parallel to provide makeup fluid to meterless circuits 58, 60, 62, 64. Charge pump 102 may embody, for example, an engine- or ground-driven, variable- or fixed-displacement pump configured to draw fluid from a tank 106, pressurize the fluid, and discharge the fluid into common passage 100. Accumulator 104 may embody, for example, a compressed gas, membrane/spring, or bladder type of accumulator configured to accumulate pressurized fluid from and discharge pressurized fluid into common passage 100. Excess hydraulic fluid, either from charge pump 102 or from meterless circuits 58, 60, 62, 64 (i.e., from operation of pumps 68A-68D and/or the rotary and linear actuators) may be directed into either accumulator 104 or into tank 106 by way of a charge relief valve 108 disposed in a return passage 110. Charge relief valve 108 may be movable from a flow-blocking position toward a flow-passing position as a result of elevated fluid pressures within common passage 100 and return passage 110. A manual service valve 112 may be associated with accumulator 104 to facilitate draining of accumulator 104 to tank 106 during service of charge circuit 66.

During operation of machine 10, the operator of machine 10 may utilize interface device 46 to provide a signal that identifies a desired movement of the various linear and/or rotary actuators to a controller (not shown). Based upon one or more signals, including the signal from interface device 46 and, for example, signals from various pressure and/or position sensors (not shown) located throughout hydraulic system 56, the controller may command movement of the different valves and/or displacement changes of the different pumps and motors to advance a particular one or more of the linear and/or rotary actuators to a desired position in a desired manner (i.e., at a desired speed and/or with a desired force).

The controller may embody a single microprocessor or multiple microprocessors that include components for controlling operations of hydraulic system 56 based on input from an operator of machine 10 and based on sensed or other known operational parameters. Numerous commercially available microprocessors can be configured to perform the functions of the controller. It should be appreciated that the controller could readily be embodied in a general machine microprocessor capable of controlling numerous machine functions. The controller may include a memory, a secondary storage device, a processor, and any other components for running an application. Various other circuits may be associated with the controller such as power supply circuitry, signal conditioning circuitry, solenoid driver circuitry, and other types of circuitry.

INDUSTRIAL APPLICABILITY

The disclosed hydraulic system may be applicable to any machine where improved hydraulic efficiency and performance is desired. The disclosed hydraulic system may provide for improved efficiency through the use of meterless technology. The disclosed hydraulic system may provide for enhanced functionality and control through the selective use of novel circuit configurations. Operation of hydraulic system 56 will now be described.

During operation of machine 10, an operator located within station 20 may command a particular motion of work tool 14 in a desired direction and at a desired velocity by way of interface device 46. One or more corresponding signals generated by interface device 46 may be provided to the controller indicative of the desired motion, along with machine performance information, for example sensor data such a pressure data, position data, speed data, pump displacement data, and other data known in the art.

In response to the signals from interface device 46 and based on the machine performance information, the controller may generate control signals directed to pumps 68A-68D, motors 43, 42L, 42R, and valves 80A-80D, 82A-82D, 84A-84D, 88, 90, 94. For example, based on the signals from interface device 46, the controller may determine which actuators to operate, and the speed and direction of movement of the actuators. The controller may also determine which of swing motor 43, hydraulic cylinder 32, left travel motor 42L, and right travel motor 42R to fluidly connect to which one or both of pumps 68C and 68D. In the disclosed embodiment, each of hydraulic cylinder 32, left travel motor 42L, and right travel motor 42R may be selectively connected to receive fluid in parallel and in a closed loop manner from pumps 68C and/or 68D.

The controller may control combining valve arrangement 80 and switching valve arrangements 82, 84 depending on which actuators in meterless circuits 62, 64 to operate and a desired amount of flow to direct to the actuators. For example, as described above, combiner valve arrangement 80 and switching valve arrangements 82, 84 may be controlled to select which actuators in meterless circuits 62, 64 receive combined flow from both pumps 68C and 68D, or from only one of pumps 68C and 68D.

In certain operations, it may be desirable to increase the amount of fluid communicated to the actuator(s), e.g., so that the actuator(s) may move faster, by providing fluid from more than one of pumps 68C and 68D to the actuator(s). Thus, combined flow from two pumps may be provided to one or more actuators if an increase in speed of the actuator(s) is desired within the power capabilities of the engine.

Combining flow from two pumps to supply to one or more actuators may also assist in ensuring that the actuators operate as desired. Each of pumps 68C and 68D has a flow rate limit dictated by its respective maximum displacement. Certain actuators, however, may require a flow rate greater than the maximum flow provided by a single pump in order to function as desired (e.g., to fulfill cycle requirements, such as cycle timing, etc.). For example, hydraulic cylinder 32 (associated with stick 28) may require flow from more than one pump in order to meet single-function performance requirements. Thus, if operation of a particular actuator is initiated and it is determined that more than one of pumps 68C and 68D are needed to provide the desired flow rate to the actuators to be operated, then the controller may generate a control signal that causes combiner valve arrangement 80 and switching valve arrangements 82, 84 to communicate a combined flow from both pumps 68C and 68D to the actuators to be operated. For example, if hydraulic cylinder 32 is moving, and it is desired to increase the flow rate to hydraulic cylinder 32 so that the hydraulic cylinder 32 receives a combined flow from pumps 68C and 68D, the controller may generate a control signal that causes combiner valve arrangement 80 and switching valve arrangement 82 to communicate flow from both pumps 68C and 68D to hydraulic cylinder 32, as described above. As a result, hydraulic cylinder 32 may receive sufficient flow to operate as desired due to the combined flow from both pumps 68C and 68D. At the same time, pumps 68C and 68D may also communicate flow to swing motor 43 and left and right travel motors 42L, 42R (via switching valve arrangement 84), if desired.

In certain situations, multiple actuators may be operated simultaneously, but the desired flow rate to the operating actuators (the commanded amount) may exceed the flow rate that the pumps are capable of supplying to those actuators. In such situations, the controller may prioritize one or more actuators so that the desired flow rate is supplied to the actuators having higher priority. For example, in certain embodiments, hydraulic cylinder 32 associated with stick 28 may have the highest priority so that if the operator is moving hydraulic cylinder 32, swing motor 43, left travel motor 42L, and right travel motor 42R simultaneously, the controller may ensure that hydraulic cylinder 32 receives a flow rate at a predetermined value, which may cause less flow to be directed to swing motor 43, left travel motor 42L, and right travel motor 42R. As another alternative, the controller may scale down the commanded rates of flow to all of the actuators being operated.

Further, in certain situations, since different actuators may operate simultaneously and require a different rate/pressure of flow to function as desired, combiner valve arrangement 80 and switching valve arrangements 82, 84 may be controlled to maintain a pressure difference between meterless circuits and/or between different actuators. For example, when a combined flow from pumps 68C and 68D is communicated in a closed loop manner to hydraulic cylinder 32 and swing motor 43, it may be desired to supply flow at a higher pressure to hydraulic cylinder 32 than swing motor 43. Thus, the controller may generate a control signal that causes combiner valve arrangement 80 (e.g., valves 80A and 80D) to maintain a pressure difference so that flow in meterless circuit 64 that is communicated to hydraulic cylinder 32 is at a higher pressure than flow in meterless circuit 62 that is communicated to swing motor 43.

As described above, displacement control of pumps 68A-68D may depend on the desired operation of the rotary and linear actuators. When both rotary and linear actuator motion is simultaneously desired within a single closed loop, however, directional displacement control of the associated pump may be driven based solely on the desired motion of the linear actuator(s) (although the displacement magnitude of pump may be based on flow requirements of both the rotary and linear actuators). Speed and direction of movement of the linear actuator(s) may be adjusted independently using pumps 68A-68D. In order to cause the rotary actuator(s) to move in a desired direction at a desired speed and/or with a desired torque, the displacement of the rotary actuator(s) may be selectively varied based on its over-center nature.

When two or more of the linear and/or rotary actuators receive flow from one or two of pumps 68C and 68D, then displacement control of the pump(s) may be determined based on the meterless circuit receiving flow from the pump (s) having the higher load (pressure). For example, when a combined flow from pumps 68C and 68D is communicated in a closed loop manner to hydraulic cylinder 32 and motors 42L, 42R, it may be desired to supply flow at a higher pressure to hydraulic cylinder 32 than motors 42L, 42R. Thus, directional displacement of pumps 68C and 68D may be controlled to ensure that the higher pressure for hydraulic cylinder 32 is supplied. Displacements of motors 42L, 42R may be adjusted to meet their individual torque demands. As another example, when a combined flow from pumps 68C and 68D is communicated in a closed loop manner to hydraulic cylinder 32 and motors 42L, 42R, it may be desired to supply flow at a higher pressure to motors 42L, 42R than hydraulic cylinder 32. Thus, directional displacement of pumps 68C and 68D may be controlled to ensure that the higher pressure for motors 42L, 42R is supplied. Flow to hydraulic cylinder 32 may be controlled by throttling flow to hydraulic cylinder 32 via valve arrangements 80 and/or 82.

Regeneration of fluid may be possible during retracting and/or extending operations of the linear actuators, such as hydraulic cylinder(s) 26, 32, 34, when the pressure of fluid exiting the hydraulic cylinder is higher than the pressure of fluid entering the hydraulic cylinder (e.g., when the pressure in first chamber 52 is higher than the pressure in second chamber 54 of hydraulic cylinder(s) 26, 32, 34 for the case of an overrunning retraction operation of the hydraulic cylinder). Specifically, during the retracting operation described above, both makeup valves 94 for the respective hydraulic cylinder(s) 26, 32, 34 may be simultaneously moved toward their flow-passing positions. In this configuration, makeup valves 94 may allow some of the fluid exiting first chamber 52 to bypass pump(s) 68A-68D and flow directly into second chamber 54. During the extending operation, both makeup valves 94 fluidly connected to hydraulic cylinder 32 may be simultaneously moved toward their flow-passing positions. In this configuration, makeup valves 94 may allow some of the fluid exiting second chamber 54 to bypass pump(s) 68A-68D and flow directly into first chamber 52. These operations may help to reduce a load on pumps 68A-68D, while still satisfying operator demands, thereby increasing an efficiency of machine 10. In some embodiments, makeup valves 94 may be held partially closed during regeneration to facilitate some energy dissipation that improves controllability.

Makeup valves 94 may also be used to allow flow to bypass pumps 68A-68D so that an operator of machine 10 may experience an "open-center" feel associated with control of the associated hydraulic cylinder(s) 26, 32, 34. For example, makeup valves 94 may be controlled to bypass flow when the load increases up to the point of stopping motion of the actuator, e.g., determined based on a monitored or sensed flow pressure. The "open-center" feel may provide the operator with a feel for the load on the hydraulic cylinder(s) 26, 32, 34.

In the disclosed embodiments of hydraulic system 56, flows provided by pumps 68A-68D may be substantially unrestricted such that significant energy is not unnecessarily wasted in the actuation process. Thus, embodiments of the disclosure may provide improved energy usage and conservation. In addition, the meterless operation of hydraulic system 56 may, in some applications, allow for a reduction or even complete elimination of metering valves for controlling fluid flow associated with the linear and rotary actuators. This reduction may result in a less complicated and/or less expensive system.

The disclosed hydraulic system may also provide for enhanced pump overspeed protection. In particular, during overrunning retracting or extending operations of hydraulic cylinders 26, 32, 34, when fluid exiting first chambers 52 (or second chambers 54) has elevated pressures, the highly-pressurized fluid may be rerouted back into second chambers 54 (or first chambers 52) via makeup valves 94, without the fluid ever passing through pumps 68A-68D. Not only does the rerouting help to improve machine efficiencies, but the bypassing of pumps 68A-68D may also reduce a likelihood of pumps 68A-68D overspeeding.

It will be apparent to those skilled in the art that various modifications and variations can be made to the disclosed hydraulic system. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A hydraulic system comprising:
   a variable-displacement first pump;
   an over-center variable-displacement first travel motor selectively connected to receive fluid pressurized by the first pump in a closed loop manner;
   an over-center variable-displacement second travel motor selectively connected to receive fluid pressurized by the first pump in parallel with the first travel motor in a closed loop manner;
   a linear actuator selectively connected to receive fluid pressurized by the first pump in parallel with the first and second travel motors in a closed loop manner;
   at least one first isolation valve configured adjust a flow of the pressurized fluid from the first pump to the first travel motor; and
   at least one second isolation valve configured adjust a flow of the pressurized fluid from the first pump to the second travel motor.

2. The hydraulic system of claim 1, wherein the first pump is an over-center pump.

3. The hydraulic system of claim 1, further comprising at least one valve configured to adjust a flow of the pressurized fluid from the first pump to the first travel motor and the second travel motor.

4. The hydraulic system of claim 1, further comprising at least one valve configured to adjust a flow of the pressurized fluid from the first pump to the linear actuator.

5. The hydraulic system of claim 1, wherein:
   rotation directions of the first and second travel motors are configured to be independently adjusted based on the over-center nature of the first and second travel motors; and
   displacements of the first and second travel motors are configured to be adjusted to control speed or torque of the first and second travel motors independently.

6. The hydraulic system of claim 1, wherein a displacement of the first pump is configured to be adjusted based on a combined demand from the first and second travel motors and the linear actuator.

7. The hydraulic system of claim 1, further comprising:
   a variable-displacement second pump;
   a swing motor selectively connected to receive fluid pressurized by the second pump in a closed loop manner; and at least one combiner device configured to selectively connect the linear actuator to receive pressurized fluid from the second pump in a closed loop manner.

8. The hydraulic system of claim 7, wherein the at least one combiner device includes four independent metering valves.

9. The hydraulic system of claim 7, wherein the swing motor is an over-center variable-displacement motor.

10. The hydraulic system of claim 7, further comprising at least one third isolation valve configured to adjust a flow of the pressurized fluid from the second pump to the swing motor.

11. The hydraulic system of claim 7, wherein the first travel motor, the second travel motor, and the linear actuator are configured to be selectively connected in a closed loop manner to the first pump and the second pump via the at least one combiner device so that at least one of the first travel motor, the second travel motor, and the linear actuator are configured to selectively receive a combined flow from the first and second pumps.

12. The hydraulic system of claim 11, wherein the first travel motor, the second travel motor, and the linear actuator are configured to operate simultaneously while the at least one of the first travel motor, the second travel motor, and the linear actuator receive the combined flow from the first and second pumps.

13. The hydraulic system of claim 7, further comprising:
a first switching device configured to selectively disconnect the linear actuator from the first pump while the linear actuator and the third motor are selectively connected to the second pump in a closed loop manner via the at least one combiner device; and
a second switching device configured to selectively connect the first pump to the first and second travel motors in a closed loop manner.

14. The hydraulic system of claim 7, wherein the hydraulic system is provided in a machine including a drive system and an implement system, the drive system including left traction device and a right traction device, the first travel motor being configured to drive the left traction device, and the second travel motor being configured to drive the right traction device, and the hydraulic system further comprises:
a variable-displacement third pump;
a variable-displacement fourth pump;
a second linear actuator selectively connected to receive fluid pressurized by the third pump in a closed loop manner, the second linear actuator being a hydraulic cylinder configured to move a work tool of the implement system; and
a third linear actuator selectively connected to receive fluid pressurized by the fourth pump in a closed loop manner, the third linear actuator being a hydraulic cylinder configured to move a boom of the implement system.

15. The hydraulic system of claim 1, wherein:
the hydraulic system is provided in a machine including a drive system and an implement system, the drive system including left traction device and a right traction device;

the first travel motor is configured to drive the left traction device, and the second travel motor is configured to drive the right traction device; and
the linear actuator is a hydraulic cylinder configured to move a stick of the implement system.

16. A hydraulic system comprising:
a variable-displacement first pump;
a variable-displacement second pump;
an over-center variable-displacement first travel motor selectively connected to receive fluid pressurized by the first pump in a closed loop manner;
an over-center variable-displacement second travel motor selectively connected to receive fluid pressurized by the first pump in parallel with the first travel motor in a closed loop manner;
a linear actuator selectively connected to receive fluid pressurized by the first pump in parallel with the first and second travel motors in a closed loop manner;
a third motor selectively connected to receive fluid pressurized by the second pump in a closed loop manner; and
at least one combiner device configured to selectively allow pressurized fluid from the first pump to combine with pressurized fluid from the second pump so that a combined flow from the first and second pumps is supplied to at least one of the first travel motor, the second travel motor, the third motor, and the linear actuator.

17. The hydraulic system of claim 16, further comprising:
a first switching device configured to selectively disconnect the linear actuator from the first pump while the linear actuator and the third motor are selectively connected to the second pump in a closed loop manner; and
a second switching device configured to selectively connect the first pump to the first and second travel motors in a closed loop manner.

18. A method of operating a hydraulic system, the method comprising:
pressurizing fluid with a first variable-displacement pump, the first pump being capable of simultaneously supplying pressurized fluid in parallel to an over-center variable-displacement first travel motor, an over-center variable-displacement second travel motor, and a linear actuator;
selectively directing fluid pressurized by the first pump in parallel to at least two of the first travel motor, the second travel motor, or the linear actuator in a closed loop manner;
returning the pressurized fluid to the first pump;
pressurizing fluid with a second variable-displacement pump, the second pump being capable of simultaneously supplying pressurized fluid in parallel to the first travel motor, the second travel motor, the linear actuator, and a variable-displacement third, motor; and
selectively directing fluid pressurized by the second pump in parallel to at least two of the first travel motor, the second travel motor, or the linear actuator in a closed loop manner via at least one combiner device.

* * * * *

UNITED STATES PATENT AND TRADEMARK OFFICE
CERTIFICATE OF CORRECTION

PATENT NO. : 8,984,873 B2  
APPLICATION NO. : 13/279177  
DATED : March 24, 2015  
INVENTOR(S) : Opdenbosch et al.

Page 1 of 1

It is certified that error appears in the above-identified patent and that said Letters Patent is hereby corrected as shown below:

Page 2, Column 2, Item 56 (Other Publications), line 28, delete "Lafeyette," and insert -- Lafayette, --.

Column 16, line 37, In claim 1, delete "configured adjust" and insert -- configured to adjust --.

Column 16, line 40, In claim 1, delete "configured adjust" and insert -- configured to adjust --.

Signed and Sealed this  
Fifteenth Day of March, 2016

Michelle K. Lee  
*Director of the United States Patent and Trademark Office*